United States Patent Office 2,910,504
Patented Oct. 27, 1959

2,910,504
PREPARATION OF ALIPHATIC PERACIDS

Alfred T. Hawkinson, Niagara Falls, and William R. Schmitz, Grand Island, N.Y., assignors to E. I. du Pont de Nemours and Company, Wilmington, Del., a corporation of Delaware No Drawing. Application November 29, 1954
Serial No. 471,882

11 Claims. (Cl. 260—502)

This invention relates to the preparation of aliphatic peracids.

This application is a continuation-in-part of our application Serial No. 388,898, filed October 28, 1953, and now abandoned.

Aliphatic peracids are commonly prepared by reacting an aliphatic carboxylic acid with hydrogen peroxide. The reactions are equilibrium reactions as illustrated by the reaction to form peracetic acid:

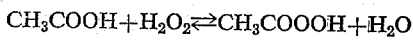

$$CH_3COOH + H_2O_2 \rightleftarrows CH_3COOOH + H_2O$$

Because the reactions are relatively slow, they are generally effected in the presence of a soluble strong mineral acid which catalyzes the reaction and permits reaching equilibrium conditions in a practical time. The most commonly used catalyst is concentrated sulfuric acid.

In most applications of the above method, the reaction is carried out in an excess of the aliphatic acid, e.g., glacial acetic acid, and the resulting product is a solution of the peracid and the catalyst in the excess of the aliphatic acid. The peracids are relatively expensive and the practicality of employing them often depends upon the feasibility of recovering the aliphatic acid for reuse. The presence of sulfuric acid employed as catalyst in the initial preparation of the peracid complicates such recovery. Furthermore, in certain uses of the preformed peracid, e.g., for epoxidizing olefinically unsaturated materials, the presence of a strong acid such as sulfuric acid cannot be tolerated and it has been necessary heretofore to neutralize the acid catalyst by the addition of an alkaline material such as caustic soda or sodium acetate before using the peracid. In carrying out epoxidation reactions, the aliphatic acid is usually recovered as an aqueous solution which must be concentrated before being reused to prepare further amounts of the peracid. Concentration without distillation causes an undesirable build-up of salts in the acid, such salts resulting from the neutralization of the acid catalyst.

It is an object of the invention to provide an improved method of preparing aliphatic peracids which avoids use of the catalysts heretofore proposed and also avoids the complications and disadvantages attending their use. A further object is to provide a method involving the use of a catalyst which is insoluble in the reaction medium and readily separated from the product peracid. Still further objects will be apparent from the following description.

The above objects are accomplished in accordance with the invention by reacting an aliphatic carboxylic acid with hydrogen peroxide in the presence of a resin which is substantially insoluble in the reaction mixture and contains acidic cation-exchange groups. Examples of such resins, many of which are known and widely used for various purposes, are the cation-exchange resins having functional acidic groups such as the sulfonic (—SO$_3$H), carboxylic (—COOH), phosphonic (—PO$_3$H$_2$) and phosphonous (—PO$_2$H$_2$) acid groups, or combinations of such groups, directly attached to the carbon structure of the resin. Such resins have been found to be highly effective as catalysts for the present purpose. Since they are insoluble in the reaction mixture, their separation therefrom following completion of the reaction to form the peracid can be easily and effectively accomplished by simple decantation, filtration or equivalent procedures.

Resins of the sulfonic acid type in which the active sulfonic acid groups are directly attached to an aromatic ring of a hydrocarbon resin structure constitute a preferred class of catalysts for the present purpose. Examples thereof are the sulfonated polymers of poly-vinyl aryl compounds, such as divinyl benzene; and the sulfonated copolymers of such poly-vinyl aryl compounds with mono-vinyl aryl compounds such as styrene, described in U.S. Patent 2,366,007. Cation-exchange resins which are the sulfonated copolymers of styrene and from about 1 to 16% divinyl benzene are well known and are commercially available. These nuclear sulfonated aromatic hydrocarbon cation-exchange resins are exceptionally active as catalysts for the present purpose, are stable under the conditions of use and remain insoluble even during long and repeated reuse. Their insolubility is, in fact, a distinct advantage in that after completion of the reaction to produce the peracid, the catalyst can be readily separated by decantation or filtration methods to leave a solution of the peracid entirely free of the catalyst. Separation by such simple methods leaves no soluble residues, e.g., salts, to remain in the product so that after use of the peracid, the remaining aliphatic acid may be concentrated and recycled ad infinitum. Another advantage is that complete separation of the catalyst is effected without neutralization, thus eliminating any danger of small amounts of catalyst being left in the product due to unintentional incomplete neutralization. A still further advantage is that the separated insoluble catalyst can be reused repeatedly.

Other types of cation-exchange resins useful as catalysts for the present purpose when in their hydrogen form and provided they are insoluble in the reaction mixture, are those containing carboxylic acid groups, such as the copolymers of divinyl benzene and acrylic or methacrylic acid; and those whose structures include phosphonic or phosphonous acid groups attached to a hydrocarbon matrix. Cation-exchange resins containing two or more types of functional acid groups are also suitable, examples of which are the sulfonated and hydrolyzed copolymers of styrene, an ester of acrylic or methacrylic acid, and divinyl benzene.

The effectiveness of cation-exchange resins as catalysts for the peracid reaction will vary somewhat depending upon the particular resin, the particular peracid being formed and upon the conditions employed in carrying out the peracid reaction. Some of the resins are not as stable as others and may tend to dissolve in the reaction mixture particularly under elevated temperature conditions. For any given conditions and reaction, the resin chosen should be one which effectively catalyzes the reaction and is substantially insoluble under the conditions of use. All of the cation-exchange resins having functional acidic groups of the above types actively catalyze peracid reactions and most are sufficiently insoluble for use in practicing the present invention when used under suitable temperature conditions. Among the cation-exchange resins commercially available, those which have the functional acid group directly attached to an aromatic ring of a hydrocarbon resin structure appear to be most satisfactory respecting insolubility and, of these, those which have the stronger acidic groups, e.g., the sulfonic acid group, are the most active catalysts and are preferred.

In practicing the invention, the resin catalyst, preferably in granular form, is added to a mixture of the aliphatic acid and hydrogen peroxide at around 15–70° C., preferably 25–50° C. Higher or lower temperatures can be used but are usually not advantageous. The resulting mixture is preferably stirred at such temperature for a period of time, e.g., 0.25 to 24 hours, suitable to effect the desired conversion to the peracid. The catalyst is then separated from the mixture, e.g., by filtration, leaving the peracid product completely free of the catalyst. Particle size of the resin does not appear to be critical, commercially available sizes ranging from around 20 to 200 mesh being generally suitable; but if the resin is used as a bed through which the reactants are passed, resin of particle size ranging from 20 to 50 mesh or larger is preferred. The amount of resin catalyst used should be sufficient to catalyze the desired reaction. A worthwhile catalytic effect will usually result from the use of as little as 0.5% based upon the total weight of the reaction mixture. The preferred amounts are in the range 2 to 10%. Amounts greater than about 15% can be used but generally result in no added advantage. If reaction is effected by passing a mixture of the reactants through a bed of the catalyst, the proportion of catalyst to reaction mixture in the reaction zone will, of course, be much higher. Since the catalyst can be reused repeatedly, the concentration at which it is employed does not affect the economics of the process to any great extent.

The invention is illustrated by the following examples in which all percentages of reagents represent percentages by weight. In all of the examples, the cation-exchange resin was used in the hydrogen state.

Example 1

A solution prepared by mixing 100 g. of glacial acetic acid and 17 g. of 50% aqueous hydrogen peroxide was stirred for 3 hours at 40–45° C. with 10 g. of "Amberlite" IR–120, a commercial cation-exchange resin which is a sulfonated copolymer of styrene and about 8% divinyl benzene and contains about one —$SO_3H$ group per benzene ring. The resulting product solution, after decanting from the resin, was found by analysis to contain 1.33 g. of unreacted $H_2O_2$ and 15.7 g. (82.7% conversion) of peracetic acid.

Example 2

Example 1 was repeated using 3 g. of the cation-exchange resin as catalyst. The product solution, after separation of the catalyst, contained 1.46 g. of unreacted $H_2O_2$ and 15.1 g. (79.5% conversion) of peracetic acid.

Example 3

Example 1 was repeated except that 5 g. of the cation-exchange resin was used as catalyst, and the reaction was carried out at room temperature during 24 hours. The product solution, after separating the catalyst, contained 1.56 g. of unreacted $H_2O_2$ and 15.1 g. (79.5% conversion) of peracetic acid.

Example 4

A mixture of 100 g. of glacial acetic acid, 17 g. of 50% aqueous hydrogen peroxide and 1.5 g. of concentrated (98%) sulfuric acid was stirred at 40–45° C. for 3 hours. The resulting solution contained 1.26 g. of unreacted $H_2O_2$ and 15.8 g. (83.3% conversion) of peracetic acid.

Example 5

Example 1 was repeated using 140 g. of propionic acid in place of acetic acid. The product solution, after separation from the catalyst, contained 2.5 g. of unreacted $H_2O_2$ and 14.1 g. (62.6% conversion) of perpropionic acid.

The product solutions from Examples 1–3 and 5, after decantation from the catalyst, were found to be suitable for direct use in carrying out epoxidation reactions. In contrast, the sulfuric acid catalyst in the product of Example 4 had to be neutralized with an alkaline material such as sodium acetate before the product could be used for the same purpose. It is evident from the examples that the present insoluble catalysts are of about the same effectiveness as sulfuric acid in catalyzing peracid formation, but unlike sulfuric acid, they can be effectively and completely removed from the reaction medium by simple physical separation methods.

A convenient method of operation is to pass a liquid mixture of hydrogen peroxide and the aliphatic acid reactant through a bed of the resin catalyst, e.g., in a column, while controlling the rate of flow through the bed and the temperature so as to effect the desired conversion in a single pass. Peracids can be continuously produced in this manner. Solutions of peracetic acid in acetic acid containing up to about 40% of the peracid have been successfully prepared simply by passing suitable mixtures of glacial acetic acid and hydrogen peroxide downwardly through a column of a resin of the kind used in Example 1. The concentration of peracetic acid in the product solution will depend upon such factors as the proportions of the reactants, the amount of water present in the feed mixture, the temperature and the contact time. Contact times of around 15 to 20 minutes generally are adequate to establish approximately equilibrium reaction conditions at a temperature of 45° C. The mixture of reactants can be passed either upwardly or downwardly through the column. Instead of a single pass type operation, the column effluent can be recycled, for example, while feeding reactants to the recycle stream at rates corresponding to the rate of reaction and simultaneously withdrawing from the system a part of the column effluent at a rate corresponding to the rates of feed of fresh reactants.

Example 6

The procedure of Example 1 was repeated using as catalyst a carboxylic-sulfonic acid type cation-exchange resin made by sulfonating and hydrolyzing a cross-linked copolymer of an ester of acrylic acid, styrene and divinyl benzene, as described in U.S. Patent 2,678,306. The product solution contained 1.58 g. of unreacted $H_2O_2$ and 14.76 g. (77.7% conversion) of peracetic acid.

A sulfonated phenol-formaldehyde resin was similarly used to obtain a 53% conversion to peracetic acid. However, the resin was not completely insoluble at the temperature used, indicating that for this resin, lower reaction temperatures would be more satisfactory.

A resin containing phosphonic acid cation-exchange groups on a hydrocarbon matrix was similarly used to obtain a 17.9% conversion to peracetic acid. When using a resin containing phosphonous acid cation-exchange groups on a hydrocarbon matrix, the conversion to peracetic acid was 22.3%. A cation-exchange resin which was a copolymer of methacrylic acid and about 8 to 10% divinyl benzene also gave a relatively poor conversion to peracetic acid. These resins are relatively weak catalysts because of the weakness of the functional acid groups compared with the sulfonic acid groups in the preferred resins.

Example 7

The procedure of Example 1 was repeated using as the resin catalyst a sulfonated copolymer of styrene and about 4% divinyl benzene. The product solution contained 1.19 g. of unreacted $H_2O_2$ and 16.5 g. (86.9% conversion) of peracetic acid.

Factors such as the weight ratio of aliphatic acid to $H_2O_2$ in the reaction mixture, the concentration of $H_2O_2$ in the aqueous solution used, and reaction time and temperature, all affect peracid formation as is well known. However, these factors have substantially the same effect regardless of the catalyst employed. Accordingly, the invention will most frequently be practiced under those conditions known to be most suitable when using prior catalysts, e.g., sulfuric acid. Ordinarily, aqueous hydrogen peroxide solutions containing at least 27% and preferably at least 35%, e.g., 50% or more $H_2O_2$, will be used.

The preferred acid reactants are the lower, saturated, normally liquid, monobasic aliphatic carboxylic acids such as acetic acid, propionic acid, butyric acid and isobutyric acid. The present catalyst can be used to catalyze the formation of performic acid, but this reaction is usually sufficiently rapid not to require a catalyst. When a liquid acid reactant is employed, it will usually be used in excess, the excess serving as reaction medium and as solvent for the peracid product. However, any liquid which is inert towards the reactants and the peracid product and, preferably, is also a solvent for the acid reactant, can be used as the reaction medium.

We claim:

1. The method comprising reacting a lower alkanoic acid with hydrogen peroxide in the presence of a resin which is substantially insoluble in the reaction mixture and contains acidic cation-exchange groups.

2. The method comprising reacting a lower alkanoic acid with hydrogen peroxide in the presence of a resin which is substantially insoluble in the reaction mixture and contains sulfonic acid cation-exchange groups.

3. The method of claim 2 wherein the resin is a nuclear sulfonated aromatic hydrocarbon cation-exchange resin.

4. The method of claim 2 wherein the resin in sulfonated polymer of a poly-vinyl aryl hydrocarbon.

5. The method of claim 2 wherein the resin is a sulfonated copolymer of a poly-vinyl aryl hydrocarbon and a mono-vinyl aryl hydrocarbon.

6. The method of claim 2 wherein the resin is a sulfonated copolymer of styrene and divinyl benzene.

7. In a method for producing a peracid by reacting a lower alkanoic acid with hydrogen peroxide, the improvement comprising carrying out said reaction in the presence of a cation-exchange resin which is substantially insoluble in the reaction mixture and whose cation-exchange groups are from the groups consisting of the $—SO_3H$, the $—COOH$, the $—PO_3H_2$ and the $—PO_2H_2$ acidic groups, and combinations thereof.

8. The method of claim 7 wherein the alkanoic acid reactant is acetic acid.

9. The method of claim 7 wherein the resin is separated from the reaction mixture after formation of the peracid.

10. The method of claim 7 wherein a liquid mixture of the reactants is passed through a bed of the resin.

11. The method of making peracetic acid whereby acetic acid is reacted with hydrogen peroxide in the presence of a resin which is substantially insoluble in the reaction mixture and contains sulfonic acid cation exchange groups.

References Cited in the file of this patent

UNITED STATES PATENTS

| | | |
|---|---|---|
| 2,366,007 | D'Alelio | Dec. 26, 1944 |
| 2,714,602 | Abbott | Aug. 2, 1955 |

OTHER REFERENCES

Swern: Chem. Reviews, August 1949, vol. 45, pp. 3 to 6.

Nachod: Ion Exchange, Academic Press Inc., New York, N.Y., 1949, pp. 265–267.

Du Pont Peroxygen Products Bulletin, April 1954 (6 pp.).